(12) United States Patent
Abbink

(10) Patent No.: US 7,388,669 B2
(45) Date of Patent: Jun. 17, 2008

(54) METHOD OF GENERATING INTERFEROMETRIC INFORMATION

(75) Inventor: Russell E. Abbink, Sandia Park, NM (US)

(73) Assignee: InLight Solutions, Inc., Albuquerque, NM (US)

( * ) Notice: Subject to any disclaimer, the term of this patent is extended or adjusted under 35 U.S.C. 154(b) by 380 days.

(21) Appl. No.: 11/204,278

(22) Filed: Aug. 15, 2005

(65) Prior Publication Data

US 2005/0270539 A1    Dec. 8, 2005

Related U.S. Application Data

(63) Continuation of application No. 10/614,267, filed on Jul. 2, 2003, now Pat. No. 6,989,901, and a continuation-in-part of application No. 10/342,578, filed on Jan. 15, 2003, now Pat. No. 6,952,266.

(51) Int. Cl.
    *G01B 9/02*     (2006.01)
    *G01J 3/45*     (2006.01)
    *G01N 21/41*    (2006.01)
    *G01N 21/43*    (2006.01)

(52) U.S. Cl. .................................... 356/455; 356/517

(58) Field of Classification Search ........ 356/451–456, 356/481, 517; 250/339.07–339.09
    See application file for complete search history.

(56) References Cited

U.S. PATENT DOCUMENTS

| | | | |
|---|---|---|---|
| 3,482,919 A | 12/1969 | Barringer et al. | 356/106 |
| 4,165,938 A * | 8/1979 | Doyle | 356/455 |
| 4,183,669 A | 1/1980 | Doyle | 356/346 |
| 4,190,366 A * | 2/1980 | Doyle | 356/455 |
| 4,265,540 A * | 5/1981 | Doyle | 356/455 |
| 4,286,877 A * | 9/1981 | Clarke | 356/455 |
| 4,515,447 A | 5/1985 | Weimer et al. | 350/527 |
| 4,544,272 A * | 10/1985 | Doyle | 356/452 |
| 4,585,345 A * | 4/1986 | Inoue | 356/455 |
| 4,654,530 A | 3/1987 | Dybwad | 250/347 |
| 4,684,255 A | 8/1987 | Ford | 356/346 |
| 4,711,576 A | 12/1987 | Ban | |
| 4,850,686 A | 7/1989 | Morimoto et al. | 350/484 |
| 4,872,756 A | 10/1989 | Hill | 356/361 |

(Continued)

FOREIGN PATENT DOCUMENTS

EP    0 681 166 B1    5/2001
WO    WO 99/38045 A    7/1999

OTHER PUBLICATIONS

U.S. Appl. No. 10/342,578, filed Jan. 15, 2003, Abbink.

(Continued)

*Primary Examiner*—Patrick J Connolly
(74) *Attorney, Agent, or Firm*—V. Gerald Grafe

(57) ABSTRACT

The present invention provides methods for generating interferometric information. Interferometric information from refractively scanned interferometers can contain errors due to wavelength-dependent refractive indices. The wavelength-dependent refractive indices of elements of the interferometer can produce errors when the OPD at a reference wavelength is different than the OPD at a sample wavelength. The invention can provide correction of interferometric information using relationships between the OPD at the wavelengths of interest, which correction can also be dependent on physical relationships among elements of the interferometer.

10 Claims, 12 Drawing Sheets

U.S. PATENT DOCUMENTS

| | | | |
|---|---|---|---|
| 4,975,581 A | 12/1990 | Robinson et al. | 250/339 |
| 5,155,551 A * | 10/1992 | Vidrine et al. | 356/455 |
| 5,173,744 A * | 12/1992 | Dybwad | 356/455 |
| 5,483,341 A * | 1/1996 | Naganuma | 356/450 |
| 5,830,132 A | 11/1998 | Robinson | 600/310 |
| 5,847,828 A | 12/1998 | Downs | 356/346 |
| 5,857,462 A | 1/1999 | Thomas et al. | 128/633 |
| 6,073,037 A | 6/2000 | Alam et al. | 600/310 |
| 6,141,101 A | 10/2000 | Bleier et al. | 356/346 |
| 6,152,876 A | 11/2000 | Robinson et al. | 600/322 |
| 6,441,388 B1 * | 8/2002 | Thomas et al. | 250/339.09 |
| 6,473,250 B1 | 10/2002 | Chapman et al. | 359/837 |
| 6,504,614 B1 * | 1/2003 | Messerschmidt et al. | 356/455 |
| 6,574,490 B2 | 6/2003 | Abbink et al. | 600/316 |
| 6,989,901 B2 * | 1/2006 | Abbink | 356/451 |
| 2003/0117629 A1 * | 6/2003 | Messersschmidt et al. | 356/455 |
| 2005/0002039 A1 * | 1/2005 | Abbink | 356/451 |
| 2005/0270539 A1 * | 12/2005 | Abbink | 356/451 |

OTHER PUBLICATIONS

Griffiths and De Haseth, *Fourier Transforms Infrared Spectroscopy*, Wiley Interscience, 1986.

W. H. Steel, *Interferometers for Fourier Spectroscopy*, Aspen International Conference on Fourier Spectroscopy, 1970, pp. 43-53 (AFCRL 71-0019, Special Report No. 114.

\* cited by examiner

METHOD OF GENERATING INTERFEROMETRIC INFORMATION

REFERENCES TO RELATED APPLICATIONS

This application claims priority 35 U.S.C. 120 as a continuation of U.S. patent application Ser. No. 10/614,267, "Interferometer," filed Jul. 2, 2003, now U.S. Pat. No. 6,989,901, and as a continuation in part of U.S. patent application Ser. No. 10/342,578, "Interferometer Alignment," filed Jan. 15, 2003, now U.S. Pat. No. 6,952,266, each of which is incorporated herein by reference.

FIELD OF THE INVENTION

The present invention generally relates to interferometers, and more specifically to methods of generating interferometric information using refractively scanned interferometers.

BACKGROUND OF THE INVENTION

A Michelson interferometer in its basic form comprises a beam splitter and two end mirrors, one in each optical path created by the beam splitter. To this basic arrangement is often added a compensator of the same material, thickness, and angle of incidence as the beam splitter substrate. This balances the optical path length in both legs at all wavelengths. A complete spectrometer based on a Michelson interferometer generally includes a light source, a means of limiting the angular subtense of light traversing the interferometer, a means of placing a sample to be tested in the optical path, and a means of detecting the light after it has traversed the two legs of the interferometer and recombined. It also contains some means of varying the optical path length difference (OPD) between the two interferometer legs to produce an interferogram, and a means of measuring this OPD, often with a position encoder based on an auxiliary monochromatic light source. Since the advent of fast Fourier transform algorithms in conjunction with a digital computer the Michelson interferometer and numerous variants of it have been used to measure the spectrum of light sources, either directly or after passing through a material with properties that can be determined by the measurement of spectral absorbance. Several authors have provided detailed reviews of this type of spectrometer and its merits relative to other spectrometers for chemometric measurements. See, e.g., Griffiths and De Haseth, *Fourier Transform Infrared Spectroscopy*, Wiley Interscience, 1986.

A simple Michelson interferometer with flat end mirrors has several problems and limitations. A Fourier transform spectrometer application typically requires that the OPD be scanned, which can be difficult with current interferometers. Conventionally, one of the end mirrors is translated along the optical axis while keeping the surface strictly perpendicular to the optical axis and constant to within a small fraction of the wavelength of the light being measured. In the long wave infrared region the requirement can be met relatively easily with a mechanical translator but it becomes increasingly difficult at shorter wavelengths. This mechanical stability problem is found to be a critical factor in chemometric applications in which the quantity of an analyte of low concentration and weak spectral features must be determined. In many such applications, high spectral resolution is of secondary importance to such factors as high throughput and spectral response stability with temperature and other environmental perturbations.

Various methods have been tried to alleviate the problem of maintaining alignment while changing OPD. One method involves the use of two retroreflectors instead of the two flat mirrors. See, e.g., Griffiths, pp. 143-147. A retroreflector changes the direction of the light by exactly 180 degrees but not necessarily along the same axis. The use of retroreflectors eliminates the tilt problem (maintenance of perpendicularity to the optical axis) but introduces a problem with shear (maintenance of colinearity of optical axes from the two interferometer branches). An interferometer with either a tilt or shear misalignment will produce a smaller useful signal for a given input light intensity and angular subtense than one in which these errors are not present. Furthermore, the effect of these errors will be wavelength dependent. Generally, conditions are such that the allowable tolerance on shear is much easier to meet than the tolerance on tilt. However, for large throughput designs, involving an extended source, the shear tolerance can still be quite difficult to adjust and maintain in practice, requiring that the retroreflector lateral position be maintained within less than a few wavelengths of the light being measured while it is moved along the optical axis to change the OPD. A retroreflector is constructed from two or more reflective surfaces that must be adjusted and maintained in precise alignment to provide a wavefront quality that does not change by more than a small fraction of a wavelength. Although at least two retroreflector designs, the cube corner and the cat's eye, are in common use, they require precision construction much more difficult to produce than a simple flat mirror.

Another related method is that of Steel (1970). *Steel*, pp. 48-49 In this method, two flat end mirrors are fixed and precisely aligned. A retroreflector is then added in a double pass arrangement to direct the light onto one of the end mirrors and then back through the retroreflector on the return trip. The advantage of this technique is that the retroreflector can be moved to create the OPD without generating tilt or shear errors, allowing a simple, non-precision mechanism to move the retroreflector. Disadvantages include the requirement for a high quality retroreflector with an aperture size at least twice as large as the beam going through the interferometer. The arrangement also does not preclude the need to adjust the angle of one of the end mirrors to eliminate tilt error. The path length through the system is also substantially increased over that of the basic Michelson, making it more difficult to collect all the light from an extended source. The double pass nature of this design also increases its sensitivity to externally induced vibration.

A second category of interferometer OPD scanning methods is based on the movement of a refractive element or elements. One example method, shown by Steel (1970), uses the movement of a wedged refractive plate into the beam in varying amounts. *Steel*, p. 49 A fixed plate, wedged at the same angle but in the opposite direction serves to compensate for tilt errors that would otherwise arise as a function of wavelength. Although affording considerable reduction in sensitivity to tilt of the moving component, tilt error is still introduced with tilt in the wedged plate if flat end mirrors are used. This problem is reduced but not eliminated in U.S. Pat. No. 4,165,938 (Doyle, 1979), where linear motion of a wedged refracting prism is used along with retroreflectors replacing the flat end mirrors. In this arrangement tilt error is avoided by the use of retroreflectors but shear error is still introduced by tilting the prism, especially for off-axis rays. Another embodiment of the refractive scanning technique is shown in U.S. Pat. No. 3,482,919 (Barringer, 1969). In this patent the compensator plate of a basic Michelson interferometer is rotated to generate the OPD. This method is based on the principle that the optical path length through a window material can be changed by rotating the window about any axis not normal to the window surface. If the two sides of the window are parallel, the OPD is changed without changing the direction of a ray, and thus no tilt error is introduced regardless of the plate position or rotation angle. This allows the OPD to be varied without disturbing the alignment of fixed, critically aligned components, such as the beam splitter and end mirrors. The penalty paid for this simplicity is that the OPD is not a linear function of the rotation angle. Various performance degradations can arise from this, which will be discussed in detail below. U.S. Pat. No. 4,654,530 (Dybwad, 1987) deals with the linearization issue by passing both legs through the same parallel plate but in different directions, so that as the plate is rotated, the OPD increases in one leg while decreasing in the other. It is then found that the net OPD change is much more linear as a function of the rotation angle. The resulting interferogram is also more symmetrical about the center burst. This is all accomplished at the expense of two additional flat mirrors and a substantial increase in total path length. In U.S. Pat. No. 4,872,756, (Hill, 1989) the same thing is achieved with the addition of only one mirror to the basic Michelson arrangement. This patent also shows an arrangement in which two plane parallel plates are added to the basic Michelson interferometer, one in each leg. By rotating these two plates together the same linearization of the OPD-angle relationship can be accomplished as with the single plate shared by both legs. The refractively scanned interferometer also enjoys a much better immunity to externally induced vibration since it can be made to require much larger physical movement of the scanning element to achieve a given OPD than does the interferometer based on the movement of a mirror. This makes it an ideal candidate for portable use outside the laboratory. A problem that often exists with refractive scanned interferometers is that the allowable extended source size in one direction is smaller than that for a Michelson interferometer and therefore the aperture size must be larger for a given throughput.

Alignment maintenance is another challenging problem with interferometers. Various "self-compensating" designs have been used which involve a number of flat mirrors or mirrors in conjunction with refractive elements. In these designs, the optical arrangement is such that the precision required for maintaining the optical alignment is built separately into each piece or sub assembly and not on the relationship between subassemblies. For an example, see U.S. Pat. No. 6,504,614 (Messerschmidt and Abbink), in which the required precision is contained within the parallelism of two faces of two solid refractive components. In European Patent no. 0 681 166 B1 (Turner, 1995) the critical precision is built into two subassemblies consisting of flat components with bonded spacers to keep the subassembly components precisely parallel. One shortcoming common to these designs is that the optical path length through the instrument becomes larger than through the simple Michelson interferometer, often by a rather large factor. The result is that, for an extended source, excessive vignetting cannot be avoided unless the clear apertures are made larger than they would need to be with an interferometer with short optical path length.

SUMMARY OF THE INVENTION

The present invention provides an improved interferometer design. Embodiments of the present invention provide a beam splitter, mounted with first and second reflective elements. In some embodiments, an OPD element mounts relative to the other elements such that a path from a port of the interferometer passes therethrough, and such that the OPD element adds a variable length to the optical path between the beam splitter and the first reflective element. The OPD element can be, for example, a refractive element that presents a thickness to the optical path. Other examples are described below. The refractive element can be mounted rotatably about an axis non-parallel to the optical path, for example about an axis substantially perpendicular to the optical path. Rotation of the refractive element about the axis will cause variation of the thickness of the refractive element presented to the optical path. Variation of that thickness causes variation of the optical path in that side of the interferometer. Since the other side of the interferometer is not subject to the same variation in length, the relative lengths of the two optical paths can be controlled.

Another embodiment of the present invention provides two OPD elements, one in each side of the interferometer. As an example, the two OPD elements can be refractive elements presenting variable thicknesses to the optical paths. The OPD elements can, for example, be mounted rotatably about axes non-parallel to the optical paths through the OPD element. Rotation about the axes presents varying thicknesses to the optical path, allowing controlled variation of the lengths of the two optical paths.

Another embodiment of the present invention comprises a beam splitter mounted relative to first and second reflective elements such that a first optical path is defined from the beam splitter, to the first reflective element, then to the second reflective element, then back to the first reflective element, then back to the beam splitter. A second optical path is defined from the beam splitter, to the second reflective element, then to the first reflective element, then back to the second reflective element, then back to the beam splitter. An OPD element mounts relative to the other elements such that it presents a variable optical path length to both optical paths. As an example, the OPD element can comprise a refractive element mounted between the first and second reflective elements. The OPD element can mount such that the thickness therethrough is variable, for example by rotation about an axes non-parallel to the two optical paths through the OPD element. Example embodiments are described which allow rotation of the OPD element to lengthen one optical path while shortening the other, providing controlled variation of the relative optical path lengths of the two sides of the interferometer.

Various embodiments of the present invention comprise corrective elements mounted with the other elements such that angular misalignment can be corrected. Various arrangements of components, materials, and methods of manufacture are also described.

Interferometers according to the present invention can be used, for example, in optical spectroscopy such as, as examples, those described in U.S. Pat. Nos. 6,441,388, 4,975,581, 6,073,037, 5,857,462, 6,152,876, 5,830,132, and U.S. patent application Ser. No. 09/832,585, each of which is incorporated herein by reference.

BRIEF DESCRIPTION OF THE DRAWINGS

The drawings, which are not necessarily to scale, depict illustrative embodiments and are not intended to limit the scope of the invention.

DETAILED DESCRIPTION OF THE INVENTION

Various example embodiments are presented below. Considerations related to design, materials, manufacture, and use follow the example embodiments.

Example Embodiment

Figure 1:
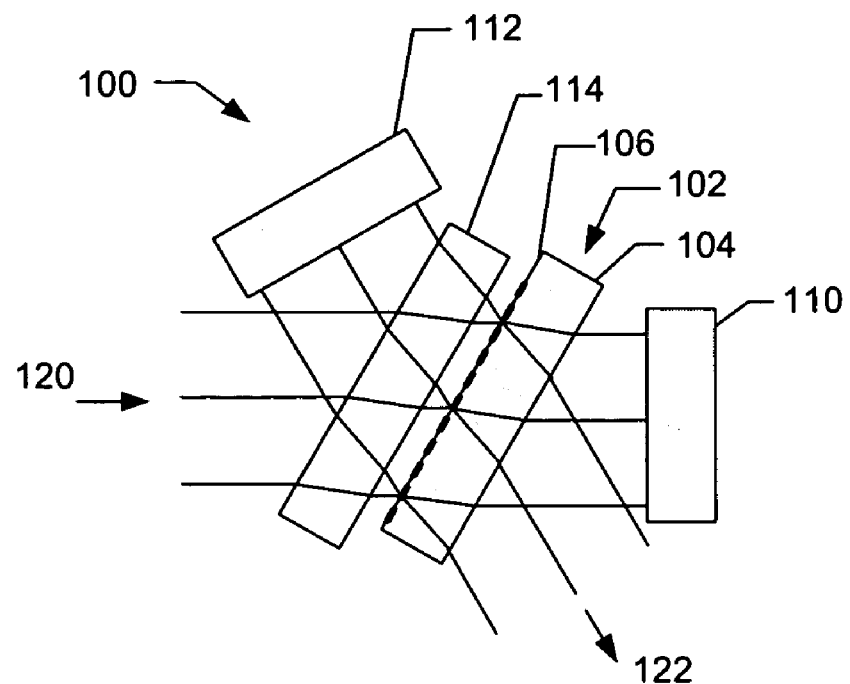
FIG. 1 is a schematic representation of an interferometer according to the present invention.

FIG. 1 is a schematic representation of an interferometer 100 according to the present invention. A beam splitter 102 comprises a substrate 104 with a beam splitter coating 106. A first reflective element 110 mounts relative to the beam splitter 102, defining a first optical path from the beam splitter 102 to the first reflective element 110 and back to the beam splitter 102. An OPD element 114 mounts relative to the beam splitter 102 such that an optical path from a port 120 of the interferometer 100 passes through the OPD element 114 before reaching the beam splitter 102. A second reflective element 112 mounts relative to the beam splitter 102 and the OPD element 114, defining a second optical path from the beam splitter 102 to the second reflective element 112 and back to the beam splitter 102, passing through the OPD element 114 at least once (twice in the figure). A second port 122 of the interferometer can be opposite the first port 120 as shown in the figure, or can be on the same side of the beam splitter 102 as the first port 120.

Interferometer 100 can be characterized for discussion purposes by two optical paths. A first path is from a port 120, through the OPD element 114, through the beam splitter 102, to the first reflective element 110, back through the beam splitter 104 to the coating thereon 106, back through the beam splitter 102 to another port 122 (or back through the OPD element 114 to port 120). A second path is from a port 120, through the OPD element 114, to the beam splitter coating 106, back through the OPD element 114, to the second reflective element 112, back through the OPD element 114, through the beam splitter 102 to another port 122 (or back through the OPD element 114 to port 120). Note that the second path includes two additional passes through the OPD element 114 compared to the first path. Varying the optical path length through the OPD element 114 accordingly varies the length of the second optical path more strongly than the length of the first optical path, providing a variable optical path difference between the two paths.

Mounting the OPD element close to the beam splitter, as in the example embodiment, can allow more compact interferometers, and shorter required path lengths, than were previously obtainable. For example, the OPD element can be mounted such that the separation distance, measured perpendicular to the direction of propagation of the input or output beam, can be less than the diameter of the beam desired to pass through the interferometer.

The reflective elements are shown in the figure as first surface plane mirrors for ease of illustration. A variety of reflective elements can be suitable, including second surface mirrors.

Various OPD element configurations can be suitable for use in this and other example embodiments presented herein. In the figure, the OPD element is depicted as a refractive element having two faces oriented non-parallel to the optical path through the OPD element. The OPD element is mounted such that it can be rotated about an axis non-parallel to the optical path through the OPD element. The thickness of the refractive element transited by the optical path is accordingly variable by rotation of the OPD element about the axis. As another example, the OPD element can comprise a refractive element having a variable thickness, for example a wedge-shaped refractive element. Translation of the wedge-shaped refractive element can provide for varying optical path length. As another example, the OPD element can comprise a refractive element having a variable index of refraction. As another example, the OPD element can comprise a reflective system whose optical path can be varied, for example a pair of spaced apart reflective surfaces oriented at angles to the interferometer optical path, whose combined rotation yields a variable optical path length.

In the example embodiment, varying optical path length can be achieved without moving the beam splitter, the first reflective element, or the second reflective element. Accordingly, those elements can be aligned and fixedly mounted.

Example Embodiment

FIG. 2(a,b,c,d,e) are schematic depictions of example embodiments that can ease the task of aligning the interferometer. In FIG. 2a, a second reflective element 212 comprises a support 230, fixedly mounted relative to the beam splitter and first reflective element, and a mirror element 232 moveable along a curved interface relative to the support 230. The support 230 and other fixed components can be fixedly mounted, then the mirror moved to correct any errors. The motion of the mirror along the curved surface can maintain contact between the curved surfaces, facilitating the use of bonding methods such as optical contacting, hydroxide catalyzed bonding, and adhesive bonding methods to fixedly mount the movable mirror after achieving acceptable alignment. The moveable mirror can also be held in place mechanically after acceptable alignment is achieved, and can be mounted to allow subsequent realignment, for example to correct for component drift or other changes in the alignment of the other elements.

Figure 2A:
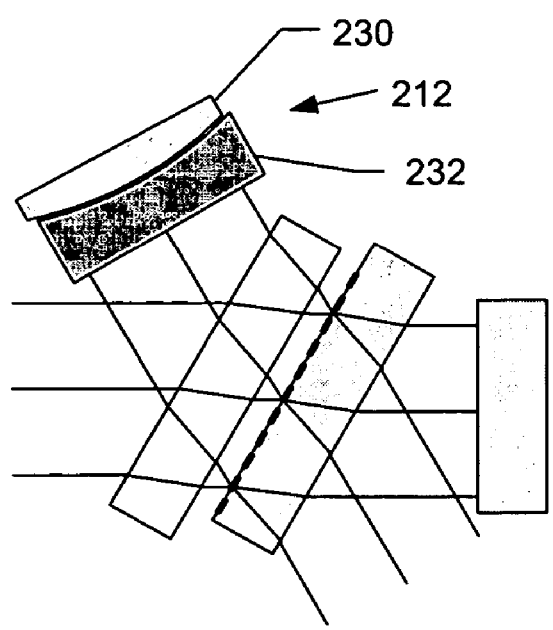
FIG. 2(a,b,c,d,e) comprise schematic representations of interferometers according to the present invention.
Figure 2B:
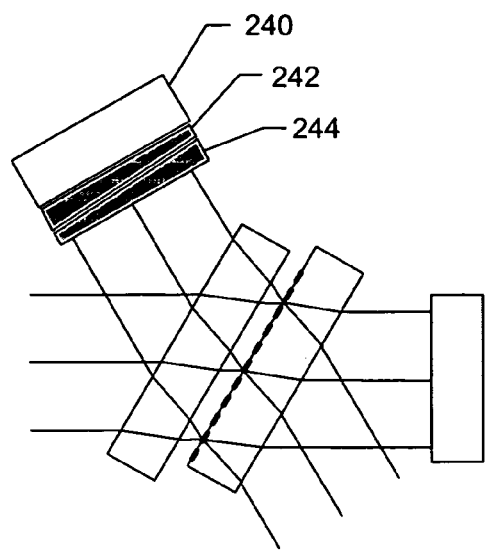

In FIG. 2b, a fixed support 240 can be mounted fixedly in relation to the beam splitter. First 242 and second 244 wedges mount movably with respect to the fixed support 240. Second wedge 244 can present a mirrored surface to the optical path. The two wedges 242, 244 can be rotated relative to each other and relative to the fixed support 240 to correct alignment errors from the mounting of the other components, for example by rotating about an axis substantially parallel to the optical path. Once the desired alignment has been achieved, the wedges 242, 244 can be fixedly mounted. The rotation of the wedges can maintain contact between the surfaces, facilitating the use of bonding methods such as optical contacting, hydroxide catalyzed bonding, and adhesive bonding methods to fixedly mount the movable elements after achieving acceptable alignment. The moveable elements can also be held in place mechanically after acceptable alignment is achieved, and can be mounted to allow subsequent realignment, for example to correct for component drift or other changes in the alignment of the other elements.

Figure 2C:
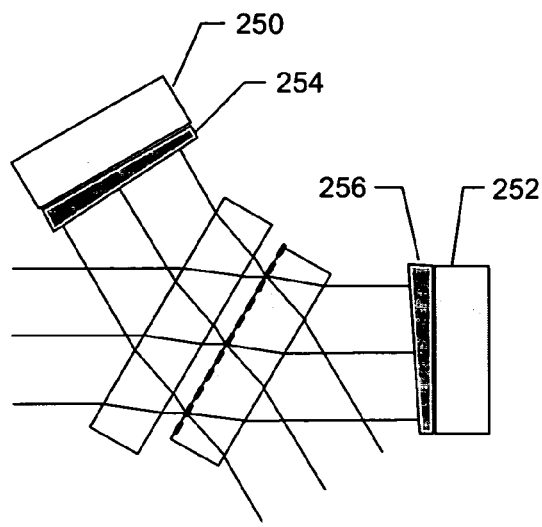

In FIG. 2*c*, each reflective element comprises a support 250, 252 mounted fixedly in relation to the beam splitter. Each support has a corresponding wedge 254, 256 mounted therewith in a manner that allows adjustment of the reflection of the optical path. For example, each wedge 254, 256 can present a mirrored surface to the optical path, and each wedge can be rotatable about an axis substantially parallel to the optical path. The angle of each mirrored surface to the optical path can be changed by rotation of the wedge, allowing correction of alignment errors in the mounting of the other interferometer elements. Once the desired alignment has been achieved, the wedges 254, 256 can be fixedly mounted. The rotation of the wedges can maintain contact between the surfaces, facilitating the use of bonding methods such as optical contacting, hydroxide catalyzed bonding, and adhesive bonding methods to fixedly mount the movable elements after achieving acceptable alignment. The moveable elements can also be held in place mechanically after acceptable alignment is achieved, and can be mounted to allow subsequent realignment, for example to correct for component drift or other changes in the alignment of the other elements.

The examples of FIGS. 2(*a,b,c*) can also be realized using second surface mirrors. In such examples, the fixed components and movable components can be interchanged in position. In FIG. 2*a*, the fixed support comprises a window, with the movable element mounted distal from the beam splitter relative to the fixed support. The moveable element comprises a mirrored surface distal from the curved surface interface.

Figure 2D:
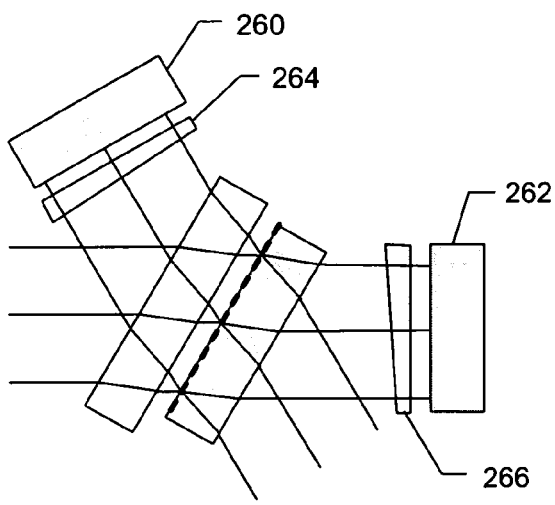

In FIG. 2*d*, each reflective element 260, 262 has an associated corrective element 264, 266, such as, for example, those described in U.S. patent application Ser. No. 10/342,578, "Interferometer Alignment," filed Jan. 15, 2003, incorporated herein by reference. The corrective elements 264, 266 can comprise, for example, refractive elements with surfaces inclined relative to each other. Varying the angular properties of the optical paths through the corrective elements, for example by rotating wedged refractive elements about axes substantially parallel to the optical path therethrough, can correct misalignment of the fixedly mounted elements. Refractive elements can be mounted in optical contact with the reflective element, reducing the number of surfaces that can foster ghost reflections.

Figure 2E:
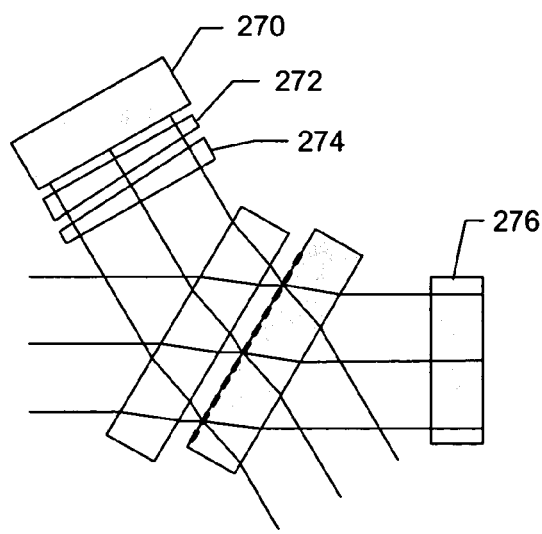

In FIG. 2*e*, a corrective element comprising two wedged refractive elements 272, 274 is associated with a first reflective element 270. As an example, the two wedged elements 272, 274 can be rotated relative to each other about an axis substantially parallel to the optical path to adjust the amount of angular correction supplied, and can be rotated with each other about a similar axis to adjust the angular application of the correction. If it is desired to keep the two optical paths symmetrical with respect to materials transited, then a refractive element (not shown) can be added to the other optical path to balance the refractive elements in the corrective. As another example, a second reflective element 276 can be a second surface mirror, with a thickness to balance the refractive elements' thickness.

Example Embodiment

Figure 3:
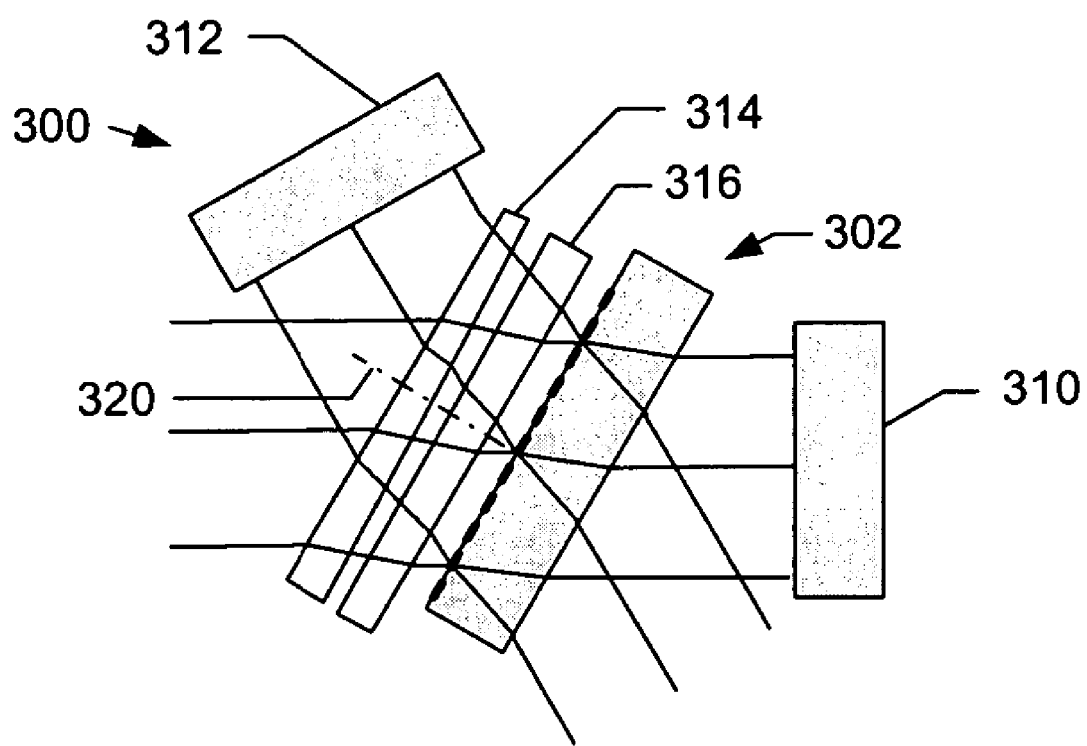
FIG. 3 is a schematic representation of an interferometer according to the present invention.

FIG. 3 is a schematic representation of an interferometer 300 according to the present invention. A beam splitter 302 mounts with first 310 and second 312 reflective elements, defining optical paths similar to those discussed with FIG. 1. The OPD element of FIG. 1, however, is replaced with first 314 and second 316 refractive elements in FIG. 3. The first 314 and second 316 refractive elements can each have opposing surfaces oriented non-parallel to each other, forming a wedge angle between the two surfaces. Rotating the first 314 and second 316 refractive elements relative to each other, and in concert with each other, for example about an axis 320 approximately normal to the surfaces, can provide controllable angular deviation of the optical paths through the OPD element. Alignment errors remaining after fixedly mounting the other interferometer elements, for example, can be corrected by such rotation. Rotating the OPD element about an axis non-parallel to the optical paths therethrough, for example about an axis approximately perpendicular to the optical paths therethrough, can provide a varying optical path length through the OPD element. Varying the optical path length through the OPD element can provide for variable optical path length difference between two optical paths of the interferometer, as described above.

Example Embodiment

Figure 4:
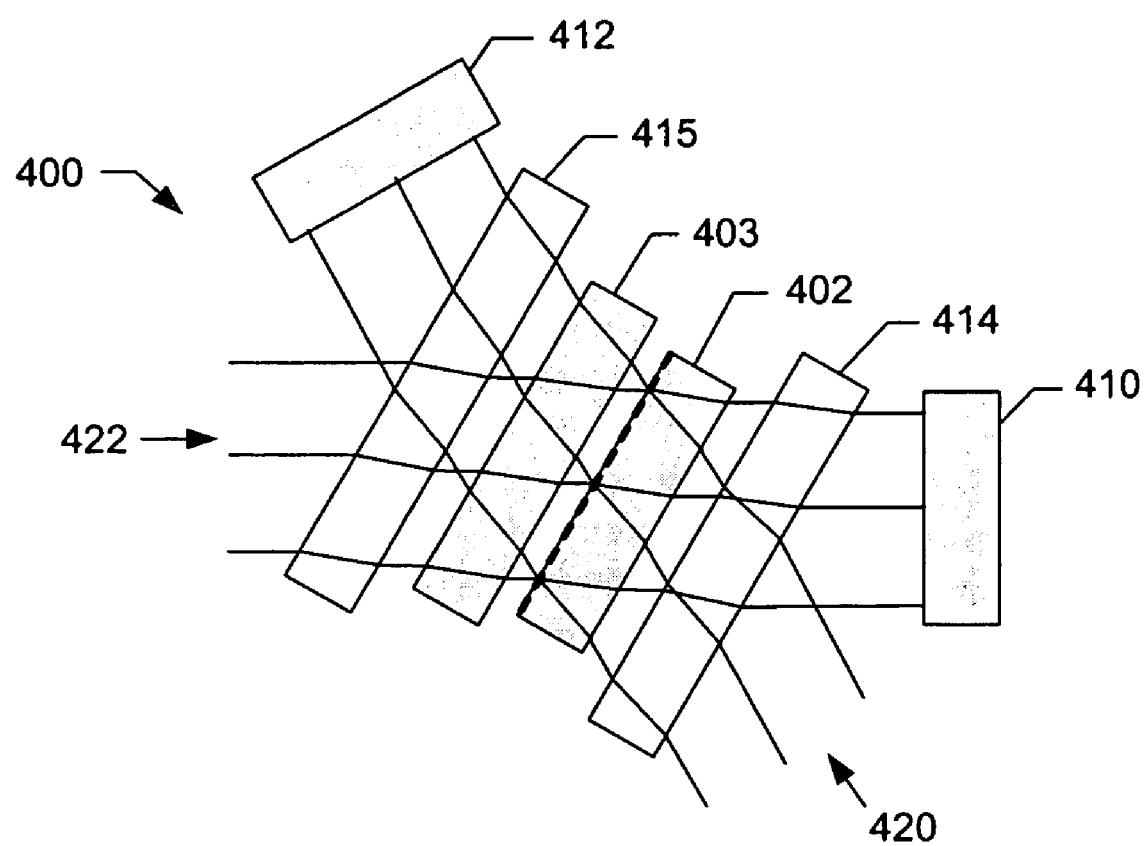
FIG. 4 is a schematic representation of an interferometer according to the present invention.

FIG. 4 is a schematic representation of an interferometer according to the present invention. A beam splitter 402 comprises a refractive plate having a beam splitter coating thereon. A compensator 403, typically a refractive plate of comparable thickness to the beam splitter but without the beam splitter coating, mounts relative to the beam splitter to provide symmetric air/glass optical paths. The compensator is not required if air/glass symmetry is not desired, or if other elements of the interferometer provide the desired symmetry (e.g., the thicknesses of the OPD elements can be designed to provide air/glass symmetry). First 414 and second 415 OPD elements mount relative to the beam splitter 402, in optical paths as described below. First reflective element 410 mounts relative to the beam splitter 402 and the first OPD element 414, defining a first optical path from the beam splitter 402 through the first OPD element 414 to the first reflective element 410, reflecting therefrom and returning through the first OPD element 414 to the beam splitter 402. Second reflective element 412 mounts relative to the beam splitter and the second OPD element 415, defining a second optical path from the beam splitter 402 through the compensator 403 and second OPD element 415 to the second reflective element 412, reflecting therefrom and returning through the second OPD element 415 and the compensator 403 to the beam splitter 402. The ports of the interferometer 400 can be configured adjacent the first OPD element 420, the second OPD element 422, or both.

The relative lengths of the first and second optical paths can be varied by varying the lengths of the optical paths through the first 414 and second 415 OPD elements. As an example, the first 414 and second 415 OPD elements can comprise refractive plates, having an optical path length therethrough determined by the angle of the plate to the optical path. Mounting the refractive plates such that they are rotatable about an axis non-parallel to the optical path, for example about an axis substantially perpendicular to the optical path, allows rotation about that axis to change the angle of the plate to the optical path. In the arrangement shown in FIG. 4, rotation of the first 414 and second 415 OPD elements, each about an axis substantially perpendicular to the corresponding optical path, can produce a variable optical path length difference. Rotation in the same direction, clockwise or counterclockwise, can produce a shortening of one path and a lengthening of the other.

Corrective elements can be added to the example of FIG. 4, similarly to those discussed previously. As an example, the OPD elements can comprise wedged plates, adjusted as described previously to correct alignment errors, then rotated about a perpendicular axis to provide controllable optical path length difference.

Example Embodiment

Figure 5:
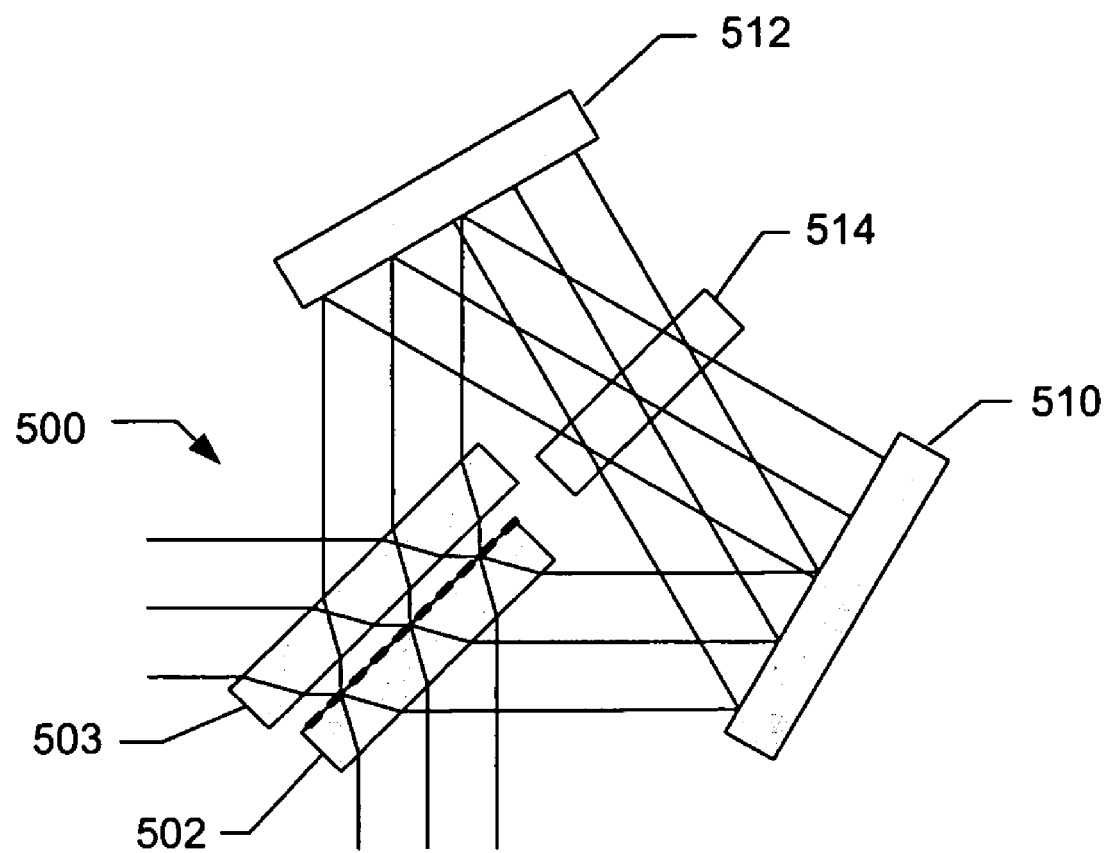
FIG. 5 is a schematic representation of an interferometer according to the present invention.
Figure 6:
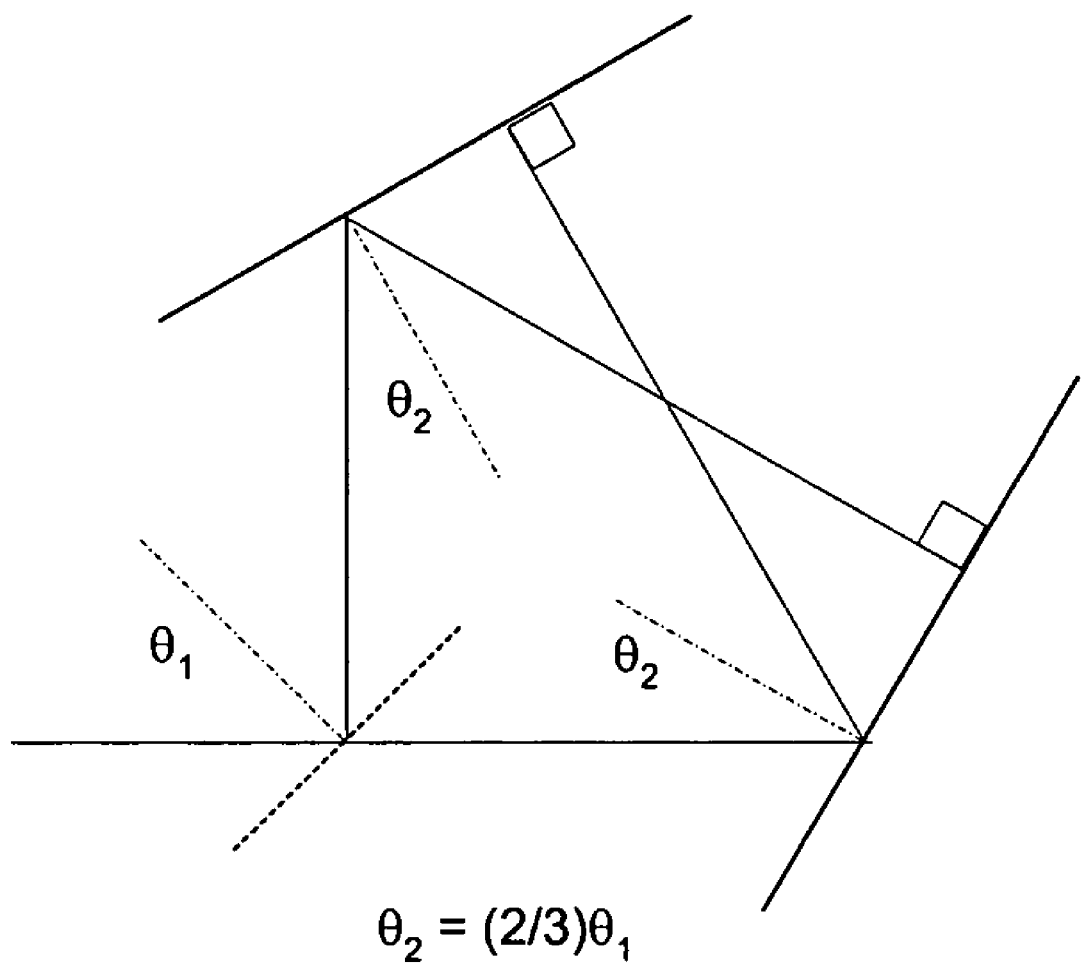
FIG. 6 is a schematic representation of angular relationships in an interferometer according to the present invention.

FIG. 5 is a schematic depiction of an interferometer according to the present invention. A beam splitter 502 comprises a refractive plate having a beam splitter coating thereon. A compensator 503, typically a refractive plate of comparable thickness to the beam splitter but without the beam splitter coating, mounts relative to the beam splitter to provide symmetric air/glass optical paths. The compensator is not required if air/glass symmetry is not desired, or if other elements of the interferometer provide the desired symmetry (e.g., other elements can be designed to provide air/glass symmetry). First 510 and second 512 reflective elements mount relative to the beam splitter 502 such that first and second optical paths are defined. First optical path can be described as beginning at beam splitter 502, reflecting from first reflective element 510 toward second reflective element 512, reflecting from second reflective element 512 toward first reflective element 510, and reflecting from first reflective element 510 toward beam splitter 502. Second optical path can be described as beginning at beam splitter 502, passing through compensator 503, reflecting from second reflective element 512 toward first reflective element 510, reflecting from first reflective element 510 toward second reflective element 512, reflecting from second reflective element 512 toward compensator 503, and passing through compensator 503 then returning to beam splitter 502. First and second optical paths intersect as they pass between first 510 and second 512 reflective elements. An OPD element 514 mounts relative to the other elements such that the first and second optical paths pass through the OPD element 514 as they pass between the first 510 and second 512 reflective elements. The ports of the interferometer 500 can be configured adjacent the beam splitter 502, the compensator 503, or both. FIG. 6 is a schematic diagram of angular relationships among the beam splitter, the first and second reflective elements, and light entering or exiting an example interferometer.

The OPD element 514 can be, for example, a refractive material having first and second faces non-parallel to either the first or second optical paths. As shown in the figure, the OPD element 514 can be an optical plate, of refractive material, with first and second faces substantially parallel to each other. Rotation of such a plate about an axis non-parallel to the first and second optical paths can produce a varying optical path length through the OPD element. If, as shown in the figure, the OPD element 514 comprises a plate oriented such that the first and second optical paths pass through the plate at angles on opposite sides of the normal to the plate, then rotation of the plate will lengthen one path while shortening the other path. Rotation of the OPD element 514 can thereby allow the optical path lengths of the first and second optical paths to be varied in a controlled way.

Example Embodiment

Figure 7A:
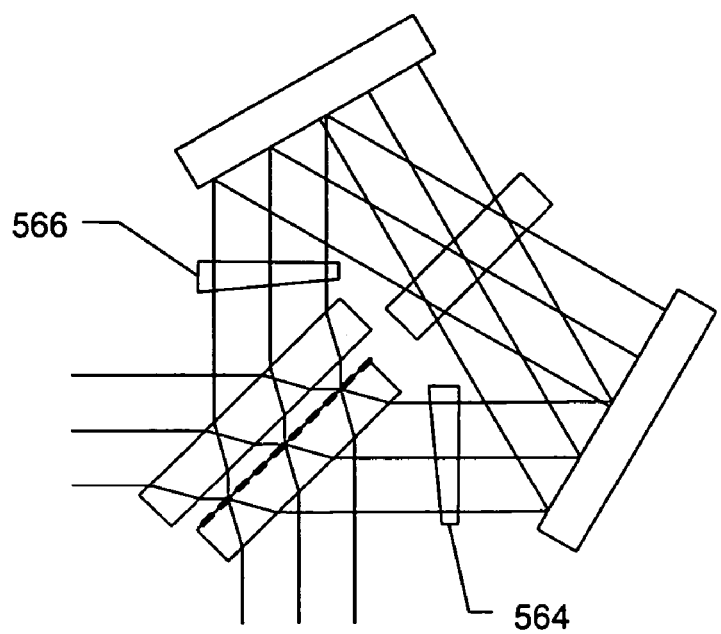
FIG. 7(a,b) comprise schematic representations of interferometers according to the present invention.

FIG. 7a is a schematic diagram of an interferometer according to the present invention. The elements mount relative to each other as in the example of FIG. 5. First 564 and second 566 corrective elements mount in first and second optical paths. First 564 and second 566 corrective elements can comprise, for example, elements such as those described in U.S. patent application Ser. No. 10/342,578, "Interferometer Alignment," filed Jan. 15, 2003, incorporated herein by reference. Management of first 564 and second 566 corrective elements can ease the task of aligning the interferometer.

Figure 7B:
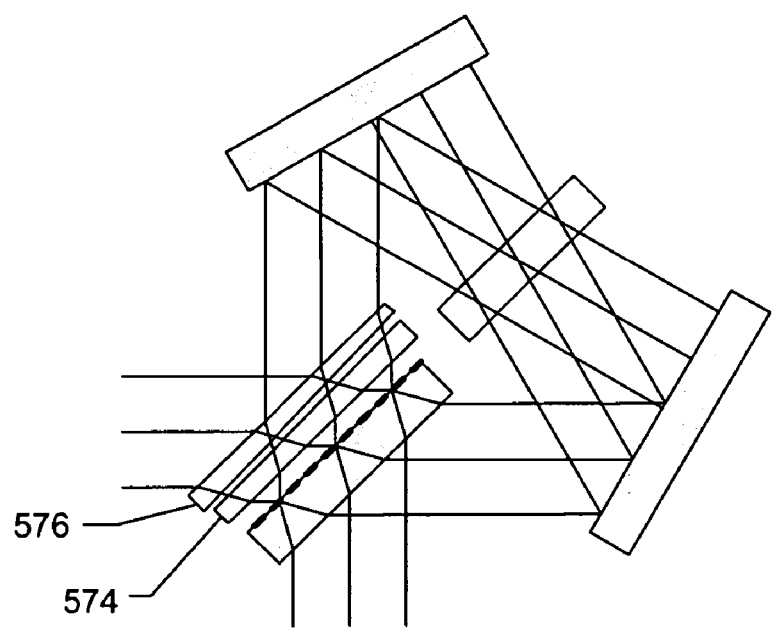

FIG. 7b is a schematic diagram of an interferometer according to the present invention. The elements mount relative to each other as in the example of FIG. 5, The compensator 503 of FIG. 5 comprises in FIG. 7b first 574 and second 576 corrective elements, such as, for example, those discussed in U.S. patent application Ser. No. 10/342, 578, "Interferometer Alignment," filed Jan. 15, 2003, incorporated herein by reference. Management of first 574 and second 576 corrective elements can ease the task of aligning the interferometer.

Design Considerations—Materials

Optical and mechanical properties can both be considered when choosing suitable materials for the construction of interferometers of the types described in this disclosure. Performance issues can be related to the optical properties of the refractive materials, including the effect of OPD scanner refractive index dispersion on spectral resolution, and the effect of OPD scanner refractive index on allowable angular source subtense. In the discussion to follow a number of equations are used which require that the OPD as a function of various construction parameters and variables be determined. This can be calculated using exact ray tracing through a mathematically modeled optical system. A number of commercially available computer programs, familiar to those skilled in the art, are available to assist with this task. One such program is distributed by Lambda Research Corporation under the name "OSLO".

An accurate measure of the OPD at each data point is required to reconstruct the spectrum of an unknown source using interferogram data. In a modern design for use in the near infrared region a monochromatic light source is often passed through the system over essentially the same path as the multiple wavelength source we wish to analyze for spectral content. The OPD at any point in an OPD scanner plate rotation can then be determined by observing the waveform of the signal produced by this monochromatic source. This waveform will be essentially sinusoidal as the plate is rotated and, thus, the zero crossings of the sinusoid accurately represent OPD increments of ½ wavelength of the monochromatic source. By sampling the amplitude of this waveform multiple times between zero crossings digital signal processing techniques allow various curve fitting and interpolation techniques to be used to accurately determine the OPD at any point in the scanner travel and not just at the zero crossings. For the monochromatic source a number of commercial instruments use a HeNe laser. This is an allowable choice when the optical system will pass this laser wavelength, usually 633 nm. Another monochromatic source is a single mode vertical cavity surface emitting laser (VCSEL). This device is very small and can be wavelength stabilized by controlling the temperature and current operating points. It and other laser diodes are available at a number of wavelengths. A Fabry Perot etalon can also be used to select a single mode from a multi-mode laser diode. It can also be used as the wavelength measuring element in an active wavelength control circuit, using either current or temperature to tune the laser diode.

One of the complications of using a monochromatic reference source to determine the OPD in a refractively scanned interferometer is that the reference source is, in general, at a different wavelength than that of the broadband source to be analyzed. Refractive optical materials normally have dispersion of the refractive index, a variation in the refractive index with wavelength. Manufacturers of optical materials often publish dispersion coefficients that can be used to calculate the refractive index as a function of wavelength. Although the use of a monochromatic reference source allows accurate measurement of the OPD at the reference source wavelength, there will be a wavelength-dependent error when applying this measurement to the determination of OPD at the various wavelengths contained in the broadband source to be analyzed. There are two phenomena to deal with here: wavelength axis distortion and spectral resolution degradation. A number of mathematical processing techniques can be applied to the interferogram data to deal with these phenomena, if needed for a specific application. The process outlined below indicates one approach.

Figure 8:
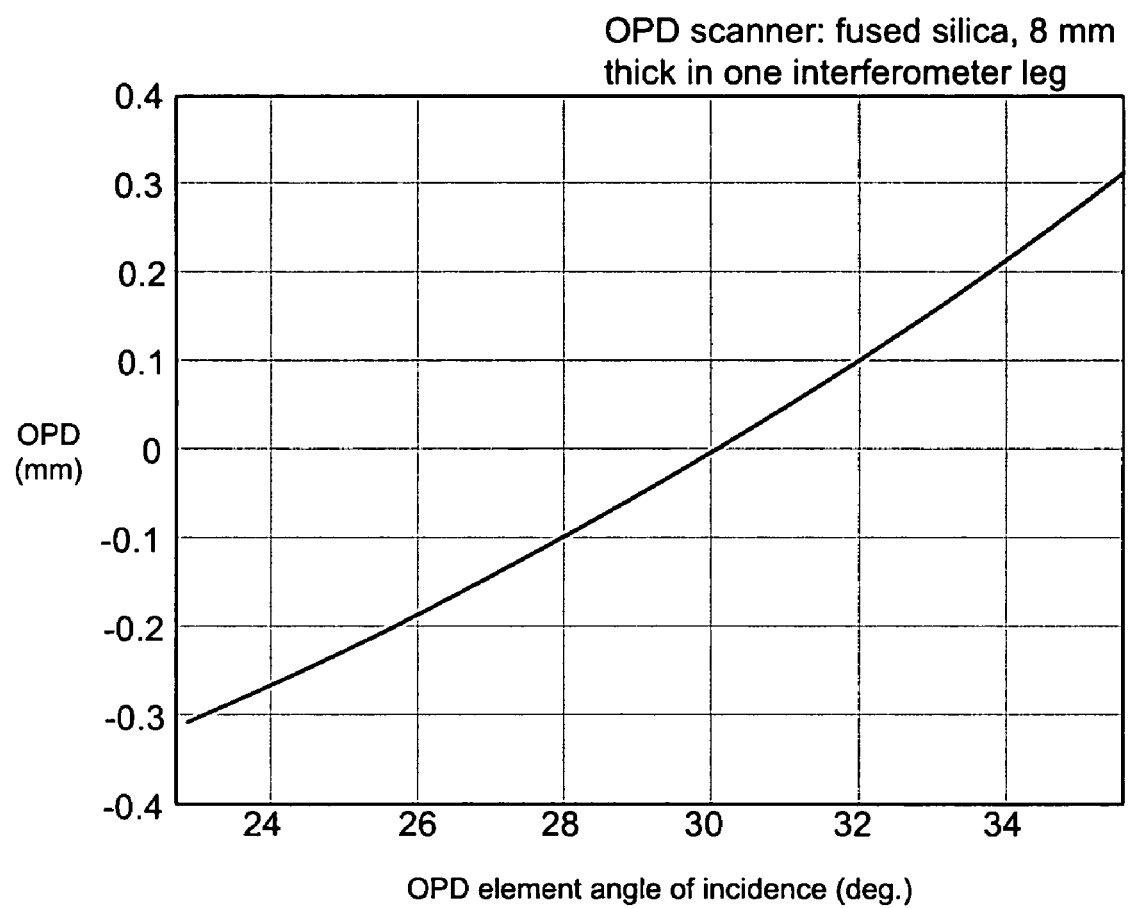
FIG. 8 is a graphical representation of a relationship between OPD element angle and OPD in an example interferometer according to the present invention.
Figure 9:
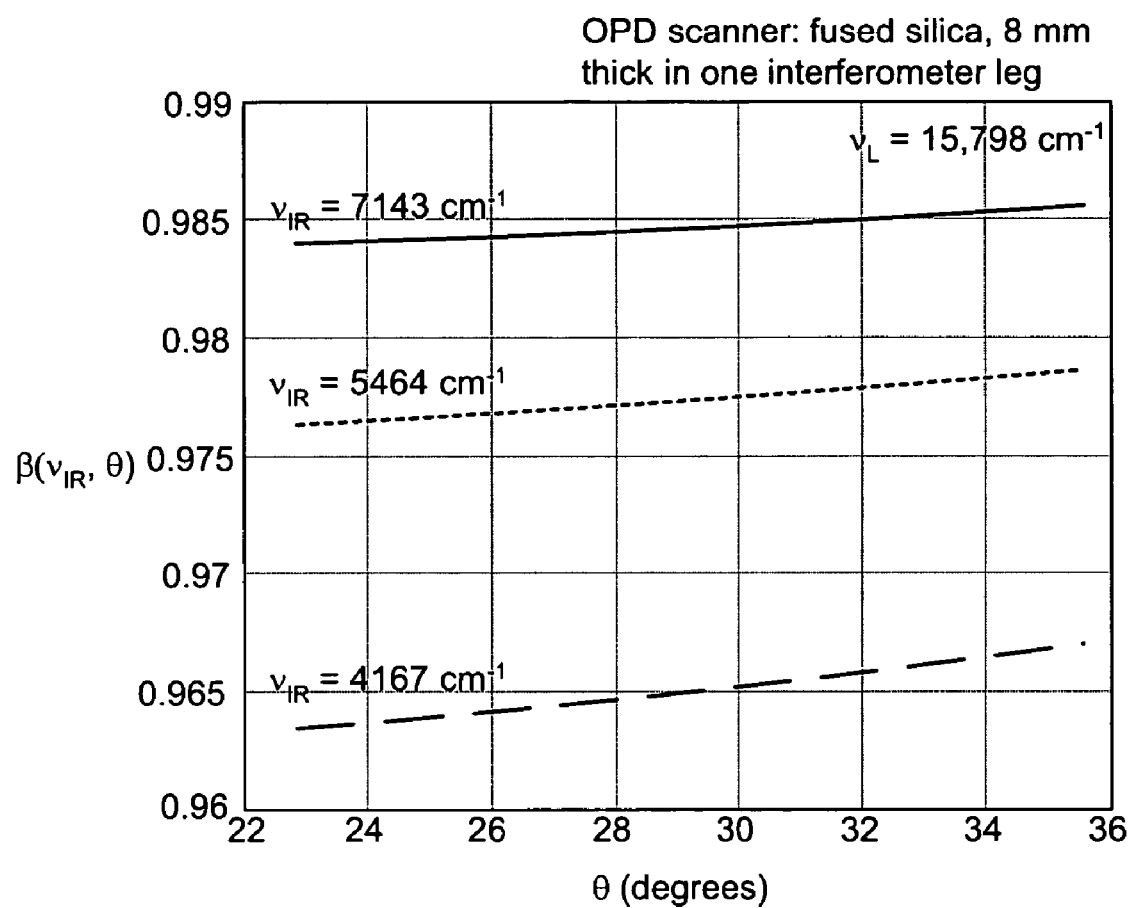
FIG. 9 is a graphical representation of angular relationships relevant to an example interferometer according to the present invention.
Figure 10:
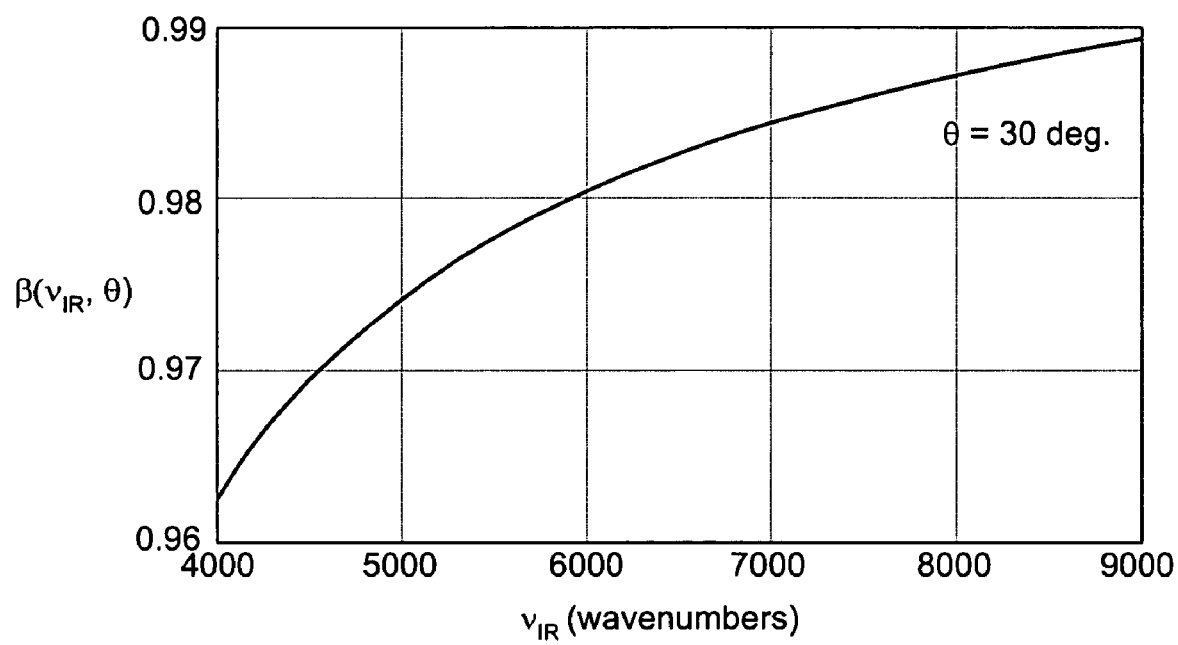
FIG. 10 is a graphical representation of angular relationships relevant to an example interferometer according to the present invention.

Let us first consider how a typical Fourier transform spectrometer measures the wavelength of an unknown source, given the wavelength of a monochromatic reference source. If the OPD at all wavelengths of interest is the same as the OPD of the reference, such as in a system without refractive index dispersion, we can write, $$v_{IR} = v_L(f_{IR}/f_L),$$

where $v_{IR}$ is the calculated wavenumber (inverse of wavelength measured in cm) of the signal being measured (referred to, hereafter as the IR signal), $v_L$ is the known wavenumber of the reference source, $f_{IR}$ and $f_L$ are the observed frequencies of the IR signal and the monochromatic reference, in the same units (e.g. cycles per second in a system with constant OPD velocity, or, in general, cycles per unit of OPD). In the usual case, the unknown signal contains a range of wavelengths. The process of Fourier transformation mathematically separates the IR signal into a series of frequencies and amplitudes. The equation above can then be applied separately to each frequency in the series. The problem with applying this equation directly to refractively scanned interferometers is that for a given physical movement, such as an angular change in the OPD scanner element, the OPD for the reference signal is different that the OPD for the signal being analyzed. Let us define a correction factor, $\beta$, such that, $$\beta(v_{IR}, \theta) = (dOPD_L/d\theta)/(dOPD_{IR}/d\theta),$$

where $dOPD_L/d\theta$ and $dOPD_{IR}/d\theta$ are the respective OPD rates of change of the two signals with respect to angle of incidence, $\theta$, on the OPD generating component. For a system with no refractive index dispersion, the value of $\beta$ is equal to 1. In general, the value of $\beta$ will be dependent on the wavelength of the IR and reference signals and the angle of the OPD scanner component, as well as a number of construction parameters, such as the material and thickness of the OPD scanner component. Of these, we will assume that only $v_{IR}$ and $\theta$ are variables during the measurement process. FIG. 8 shows a typical OPD vs. rotation angle curve for the interferometer configuration of FIG. 1. Notice that the slope of the curve varies with angle. This slope is also a function of wavenumber. FIG. 9 shows a typical $\beta$ function vs. $\theta$ at three different wavenumbers for the interferometer configuration of FIG. 1. For the same conditions, FIG. 10 shows how the $\beta$ function varies with $v_{IR}$ at a fixed $\theta$.

We can then write, $$v_{IR} = v_L(f_{IR}/f_L)\beta(v_{IR}, \theta).$$

A problem with implementing this equation directly is that the value of $\beta$ is dependent on $v_{IR}$, the quantity being calculated and on $\theta$, a quantity varying continuously during the measurement. For a given value of $\theta$ we can use a simple recursive algorithm to calculate $v_{IR}$. For example, we can start by calculating an estimate of $v_{IR}$ by setting $\beta$ equal to 1 in the above equation. Then use this estimate to calculate a new value for $\beta$, repeating this process until the estimated and calculated value for $v_{IR}$ agree to within the desired precision. Although the variation in $\beta$ with $v$ leads to a distortion in the wavelength axis if not corrected, for a number of applications, such as chemometric applications involving a separate calibration process, the actual wavelengths do not need to be known and no correction is necessary.

The variation in $\beta$ with $\theta$ leads to a loss of spectral resolution, which, in some applications could be a limiting factor. Consider an interferometer of the type shown in FIG. 1, with a variation in $\beta$ as shown in FIG. 9. For a 32 cm$^{-1}$ resolution, two-sided interferogram, this interferometer requires an OPD element rotation from about 22.7 degrees to 35.6 degrees, with zero path difference (ZPD) occurring at 30 degrees. The equation used to generate FIG. 9 shows that at a wavenumber of 5464 the value of $\beta$ at 30 degrees is 0.9775 varying from 0.9764 to 0.9787 at the extreme angles of interest. This means that, for a monochromatic signal at 5464 wavenumbers, if we were to just look at the frequency ratio at one end of the interfereogram and compare it to the frequency ratio at the other end of the interferogram and calculate $v_{IR}$ using the $\beta$ value for 30 degrees, we would get values that differed by about 13 wavenumbers. In other words, a Fourier transform of an interferogram uncorrected for this phenomenon will show a poorer resolution than that expected by the finite length of the interferogram. The value of 13 wavenumbers in the above example is over-pessimistic if we consider that common practice in interferogram pre-processing is to apply an apodization function to de-emphasize the effect of the signal at larger OPD values. Nevertheless, this phenomenon can become a limiting factor in an interferometer built for higher resolution, considering that higher resolution requires that a larger OPD range be covered, which results in an even larger variation in $\beta$ across the OPD range.

One way to reduce the magnitude of this broadening is to choose a reference laser wavelength closer to the wavelength of the light being analyzed. Another is to choose a low dispersion material for the OPD scanning element. For example Calcium Fluoride will produce a smaller broadening than fused silica. The phenomenon can also be corrected at a single wavelength by resampling the interferogram, using the known mathematical relationship between the OPD values generated by the reference laser and the analysis wavelength. In this method, for example, at each zero crossing of the reference laser signal a phase delay can be calculated which will give the position at which the signal amplitude being analyzed should be measured to provide a set of measurements at equally spaced OPDs. Interpolating the interferogram to these values will then provide a set of data that can be Fourier transformed to obtain a spectrum with the theoretical resolution. This correction is only exact at a single wavelength. However, judicious choice of the correction wavelength can minimize the error at other wavelengths within the measurement range. For example, applying the interferogram resampling correction method at a wavenumber of 5464 restores full theoretical resolution at that wavenumber and reduces the resolution broadening at the extremes of 4167 and 7143 wavenumbers from 13 to 5.3 wavenumbers. The correction can be repeated at as many wavelengths as necessary to obtain higher resolution segments of the spectrum. By this process, the loss of resolution caused by single-sided OPD scanning can be reduced as desired. The efficiency of modern digital processors makes this a practical solution that might be preferred to the expense of the additional optical components required for a different type of interferometer.

The spectral broadening of the single sided OPD scanner, discussed above, is due largely to the non-linearity of the OPD rate of change vs. angle and its variation with wavelength. Although we have indicated how this is correctable through signal processing, there are applications where higher spectral resolution without additional processing is desired. In this case the symmetrical arrangement of FIG. 4 or 5 can be used. In these arrangements the OPD scanner element rotation increases the OPD in one leg while decreasing it in the other. Because of this it is found that the rate of change of OPD with angle is nearly constant and the spectral broadening phenomenon is greatly reduced. Higher resolution also requires that the range of angles of the light going through the interferometer be reduced. Thus, the longer path length of the symmetrical designs is not as much of a problem as in the lower resolution application that allows a larger angle range.

Design Considerations—Allowable Angle Range

One of the objectives of a compact design is to maximize the throughput for a given aperture size, where throughput is the product of the transmittance, aperture area and solid angle, with transmittance including such factors as surface reflectances, material transmittances, and vignetting of the apertures. From a first order optics approximation, the product of area and solid angle is an invariant throughout an optical system. The implication of this is that an increase in the range of angles going through the interferometer can achieve a better signal or can reduce the input aperture diameter, which, in turn, can allow components to be made smaller and the path length through the interferometer to be reduced. This kind of tradeoff takes on additional complexity if we also allow the angular variation and aperture size in one plane through the interferometer to be different from that through another plane. This allowable angle in any particular direction is termed the field-of-view (FOV) in that direction. From the FOV in all directions we can calculate the solid angle.

Figure 11:
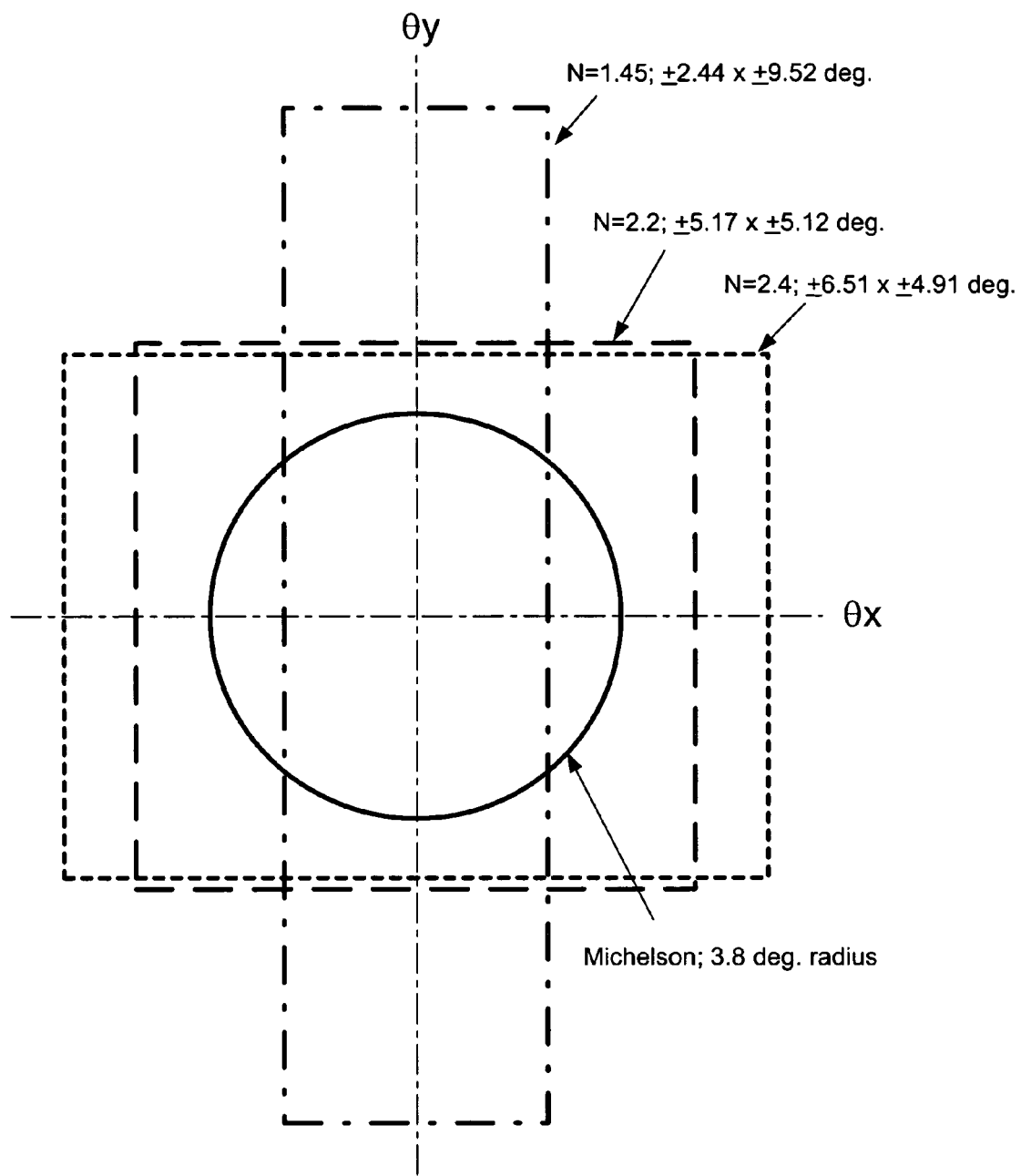
FIG. 11 is a schematic representation of a relationship between field of view and refractive index for an example interferometer according to the present invention.

FOV is defined here in a very restrictive sense as the angle of a ray through the interferometer, at which the output signal produced by this ray is phase shifted by 180 degrees relative to the signal produced by the axial ray. This angle is further defined at a specific wavelength, often the shortest wavelength of interest, and at the maximum OPD required for the desired resolution. The significance of this angle is that it defines a practical limit for the size of an extended source. For a Michelson interferometer without any refractive scanning components this angle is given as $\phi^2=\Delta v/v$, where $\phi$ is the maximum allowable angle or FOV, in radians, $\Delta v$ is the resolution in wavenumbers, and $v$ is the largest wavenumber of the light to be analyzed. From this equation, we see that a requirement for higher resolution (smaller $\Delta v$) leads to a requirement for a smaller angle range for the light going through the interferometer. For a Michelson interferometer a uniform extended source of circular geometry with this FOV will generate an interferogram for monochromatic light in which the signal intensity at the maximum OPD will be 64% of the intensity at zero path difference (ZPD). This phenomenon is often referred to as self-apodization. For a refractively scanned interferometer, such as those according to the present invention, the FOV is not circular and can be a strong function of the refractive index of the material used in the scanner. In FIG. 11 the FOV for an example refractively scanned interferometer is shown for several refractive indices. The example in FIG. 11 is of field of view as a function of scanner refractive index for a spectrometer with 32 cm$^{-1}$ resolution at 7200 cm$^{-1}$, with the y axis parallel to the rotation axis. The FOV of a Michelson interferometer is also shown for comparison. The refractive scanner FOV is shown as rectangular although the actual angles for 180-degree phase shift follow a more complex curve. The rectangles shown are the largest that will fit inside the more complex shape. Under the defined conditions, at a refractive index of approximately 2.2 the FOV is square. This might be a desirable refractive index to use if we wish to pass the maximum diameter circular FOV. Thus, proper choice of refractive index for the OPD scanner can make the refractively scanned interferometer capable of significantly greater FOV than the simple Michelson. It can also be tailored to various source geometries other than circular. A large FOV is desirable in many applications because it allows a larger diameter light source to be used and therefore a larger signal to be obtained for a given size of instrument. If we wish to use a different material for the OPD scanner than for the other fixed components it can be advantageous to use one of the symmetrical configurations such as those depicted in FIGS. 4 and 5. For example, in the FIG. 5 configuration the fixed components, consisting of the beam splitter, compensator and two end mirrors, could be made of fused silica and epoxy bonded to a fused silica base plate. Then a higher refractive index material, such as ZnS or ZnSe, could be used for the OPD element, allowing a larger circular FOV to be utilized than would be allowed for a fused silica OPD element.

Design Considerations—Construction and Alignment

In an interferometer according to the present invention, stationary components can be permanently mounted and critically aligned. Non-stationary components, such as an OPD scanner plate or plates and wedged corrector plates, have relaxed alignment tolerances and so can "float" relative to the other components. Traditionally, glass optical components have been held in metal mounts using fasteners of various sorts, and attached to a metal structure to hold them all together. Interferometers according to the present invention, however, lend themselves to simple monolithic construction techniques in which the fixed components are made of the same material and bonded directly to a base plate or metering structure of similar material. Superior long-term stability can be achieved over traditional mounting techniques.

Several highly stable bonding techniques are available for interferometer construction. Frit bonding is a common method of forming a high integrity permanent bond between two components. In this method two components, made of a compatible material such as fused silica, are fused together by pressing between them an intermediate material, often in powder form, and sintering by bringing the assembly to a high temperature, around 1200 K, but below the melting point of the materials. See, e.g., U.S. Pat. No. 6,141,101 (col. 7, paragraph 3). The optical stability of such bonds can be excellent but the process suffers from the need to bring the assembly to high temperature. This can prevent pre-coating the surfaces of the mirrors and beam splitter with desirable coatings before assembly. Although such coatings can, in some cases, be applied after assembly this places a severe restriction on the size and geometry of the assembly. It can also be difficult to maintain the alignment of all components to the small fraction of a wavelength required for final interferometer operation while heating the assembly to a high temperature. Frit bonding is often used to bond some of the components in a monolithic assembly and a second, room temperature bonding technique used for at least one of the critically aligned components.

A model of the interferometer of the FIG. 1 configuration was successfully built using this combination technique. The beam splitter, one end mirror, top and bottom plates, and two support members were all made of fused silica and permanently bonded together using a frit bonding technique. The end mirrors and beam splitter were then coated with vapor deposited films for the desired reflection properties. As a final alignment step the interferometer signal was observed while the second end mirror was aligned and bonded into place with epoxy. This assembly was used in combination with a light source, sampler, relay optics, and detector, along with support drivers, processing electronics, and software to accurately measure the concentration of analytes in a series of scattering solution samples.

A second bonding technique, especially suitable for bonding fused silica and optical glass components, is described in U.S. Pat. No. 6,284,085. It is referred to as hydroxide-catalyzed hydration/dehydration. This technique forms a strong chemical bond between the two surfaces being bonded together with no thermal expansion coefficient mismatch. The bond thickness is nearly zero, limited mostly by the flatness of the components being joined. The process works at room temperature, allowing components to be pre-coated before assembly. A disadvantage of the technique is that surfaces must be in close contact, requiring finishing non-optical surfaces to exacting flatness and angle tolerances.

Another bonding technique involves using an adhesive such as an epoxy or acrylic material that can be applied in a thin layer between the surfaces to be bonded together. Some adhesives are also available in a form which can be UV cured in a matter of a few minutes. This allows the time needed for precision alignment but the components need to be held in place for only a short time after alignment during the curing process. A disadvantage of this process is that the bonding material often has a high coefficient of thermal expansion, resulting in an assembly that has less than desired stability over the operating temperature range. Shrinkage can also occur during the curing process, potentially drawing components out of alignment. There are, however, UV curable epoxy products which are heavily filled with silica to reduce the expansion coefficient and which minimize the shrinkage during cure. Once cured, they are dimensionally stable. An example of a suitable commercial product is EMI Opticast 3415. Such products have been used very successfully in the construction of interferometers of the form depicted in FIG. 2d.

Figure 12:
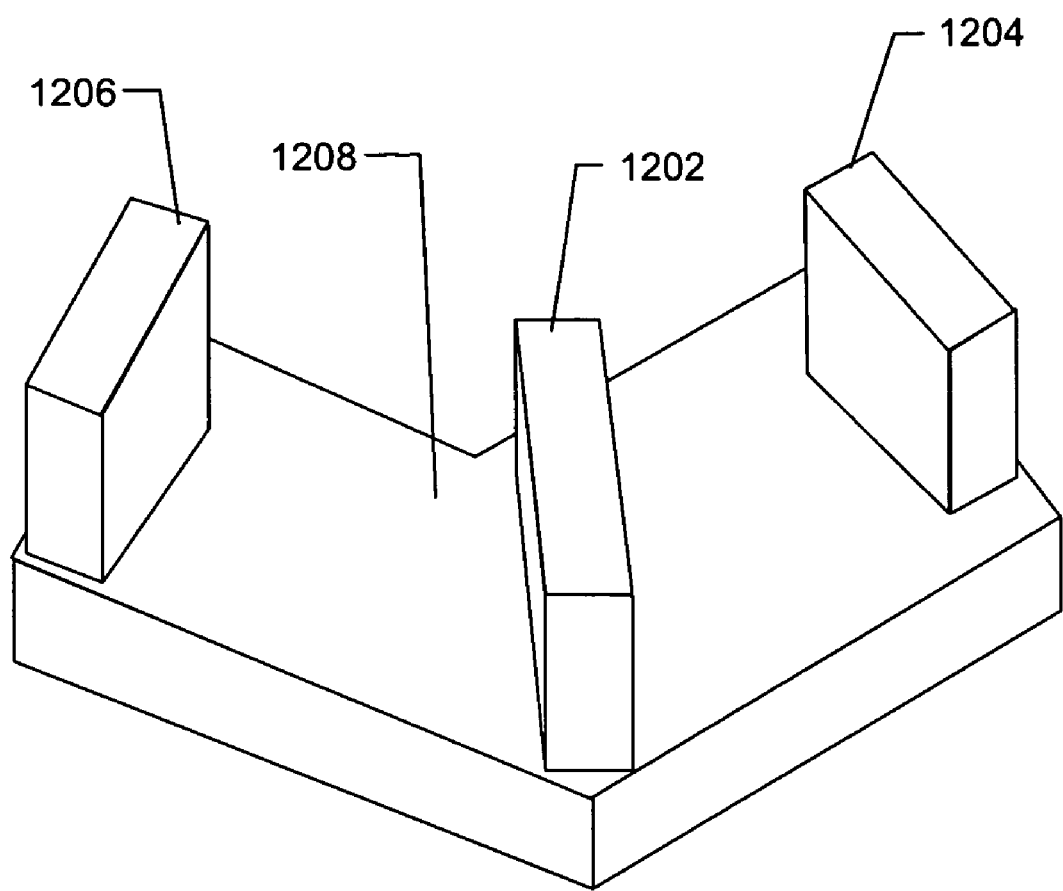
FIG. 12 is a schematic representation of an example construction of permanently mounted components of an interferometer according to the present invention.

FIG. 12 shows an example construction. A fused silica beam splitter 1202 and two fused silica end mirrors 1204, 1206 are made with a rectangular shape such that one surface of each can be placed in contact with a flat base plate 1208 of similar material. A temporary alignment fixture can be used to place these components, in approximate alignment to each other and to hold them in place during the curing of the adhesive. A silica-filled UV curing epoxy can be used to fasten the components to the base plate. The accuracy of this step need only be sufficient to place the alignment within the range correctible by wedged corrector plates, as previously described. For example, for a small wedge angle, the deviation of a ray going through a wedged glass plate is approximately equal to N−1 times the wedge angle, where N is the refractive index of the material. For fused silica, a wedge angle of 1 arc minute will deviate a ray by about 27 arc seconds. This deviation angle is only a weak function of the angle of incidence of the ray on the plate and thus the tilt angle of the plate can be changed substantially without having a large effect on the deviation angle. For example, for a fused silica corrector plate with a wedge angle of 1 arc minute, with its surfaces nominally perpendicular to the direction of propagation of the light, a tilt of 10 degrees changes the deviation angle by only 0.7 arc seconds. A ray going through a pair of such plates can be deviated to any angle between the sum and difference of the individual deviation angles. A pair of plates can be used to redirect a ray in two dimensions by rotating the plates relative to each other about their surface normals to set the magnitude of the deviation and by rotating the plates together about their surface normals to set the azimuth direction. For the purposes of angular error correction placing one of the plates in each leg of the interferometer is optically equivalent to placing them both together. To complete the alignment, this sub assembly is used in conjunction with the OPD scanner in a motor driven mount to cause it to oscillate over a range of angles including the zero path difference (ZPD) angle. An input collimated light source is used along with an output optic and detector system to observe the amplitude modulation caused by the light interference between the two interferometer legs. The two wedged correctors can be placed in holders in the positions shown in FIG. 2d and rotated while the modulated signal amplitude is observed. Proper alignment is achieved when the two corrector plates are oriented such that maximum modulation is obtained. This is easily accomplished by rotating the plates one at a time to peak the signal amplitude, alternating between the plates until a true maximum is found. Fine tuning of the OPD scanner position at which zero path difference (ZPD) occurs can also be done at the same time by tilting one of the corrector plates. Bi-directional control can be achieved if the corrector plates are distributed, one in each leg, as shown in FIG. 2d. The corrector plates can then be held in this position with a relatively low precision mounting method. Several complete interferometer systems have been produced by this method, all showing very good thermal stability using modulation efficiency as a figure of merit. Stability values, measured near room temperature, on the order of 0.15% per degree C. have been achieved. Interferometers constructed in this manner lend themselves particularly well to mass production, requiring no steps involving unusually tight tolerances.

Suppression of unwanted reflections can also be desirable in an interferometer according to the present invention. A subtle but important design improvement can be implemented by constructing the beam splitter and compensator plates with small wedge angles between the nominally parallel surfaces. This reduces the amplitude of ghost interferograms formed by light that double reflects from the two surfaces of the beam splitter and compensator plates by causing a tilt error between the recombined wavefronts of the ghost interferogram. The addition of these small wedge angles has a negligible effect on the modulation of the primary interferograms, especially if the wedge angles are kept small and they are formed in the plane perpendicular to the plane of the beam splitter surface and perpendicular to the plane formed by the axial rays reflected and transmitted by the beam splitter. Another improvement to reduce the amplitude of ghost interferograms can be achieved by tilting the rotation axis of the OPD generating element by several degrees in the plane defined above. This causes the double reflected ghost rays from one interferometer leg to be sheared from the companion rays in the other leg, again, with negligible effect on the primary rays. Another means of reducing ghost interferograms is to anti-reflection coat the clear surfaces of the beam splitter and compensator. Although greatly attenuated from the primary interferograms formed by light passing through these surfaces ghost interferograms can be a significant source of measurement error in highly accurate chemometric applications if not minimized. These ghost interferogram mitigation techniques apply to all of the embodiments described herein.

Those skilled in the art will recognize that the present invention can be manifested in a variety of forms other than the specific embodiments described and contemplated herein. Accordingly, departures in form and detail can be made without departing from the scope and spirit of the present invention as described in the appended claims.

I claim:

1. A method of generating interferometric information, comprising:
   a. Collecting reference data from a refractively scanned interferometer at a reference wavelength while the interferometer is configured with a first plurality of OPDs;
   b. Collecting sample data from the interferometer at one or more sample wavelengths while the interferometer is configured with the first plurality of OPDs; and
   c. Determining a relationship of sample data to OPD from the sample data and the first plurality of OPDs adjusted by a relationship between OPD at the reference wavelength and OPD at a selected sample wavelength.

2. A method as in claim 1, wherein:
   a. The first plurality of OPDs comprises equally spaced OPDs; and
   b. Determining a relationship of sample data to OPD comprises determining the OPD at the selected sample wavelength from the OPD at the reference wavelength and a relationship between OPD at the reference wavelength and OPD at the selected sample wavelength.

3. A method as in claim 2, wherein the relationship between OPD at the reference wavelength and OPD at the selected sample wavelength is determined from the refractive index of the refractive scanner at the reference wavelength and at the selected sample wavelength.

4. A method as in claim 3, wherein the relationship between OPD at the reference wavelength and OPD at the selected sample wavelength is determined from the refractive index of the refractive scanner at the reference wavelength and at the selected sample wavelength, and from physical relationships among elements of the interferometer.

5. A method as in claim 1, further comprising interpolating the relationship of sample data to OPD to a plurality of substantially equally spaced OPDs.

6. A method as in claim 1, further comprising determining a relationship of sample data to OPD from the sample data and the first plurality of OPDs adjusted by a relationship between OPD at the reference wavelength and OPD at a second selected sample wavelength.

7. A method of generating interferometric information using a refractively scanned interferometer, comprising:
   a. Determining the refractive index of a refractive scanner in the interferometer at a reference wavelength and at a selected sample wavelength;
   b. Determining the relationship between OPD at the reference wavelength and OPD at the selected sample wavelength for a plurality of OPDs at the reference wavelength;
   c. For each of a plurality of interferometer configurations, collecting interferogram data at the reference wavelength and at the selected sample wavelength;
   d. Determining the OPD at the reference wavelength corresponding to each of the plurality of interferometer configurations;
   e. Determining the OPD at the selected sample wavelength corresponding to each of the plurality of interferometer configurations from the OPD at the reference wavelength and the determined relationship;
   f. Associating the interferogram data at the selected sample wavelength with the determined OPD at the selected sample wavelength.

8. A method as in claim 7, wherein associating the interferogram data comprises determining estimated interferogram data at a plurality of substantially equally spaced OPDs from the collected interferogram data at the selected sample wavelength and the determined OPDs.

9. A method as in claim 7, wherein determining the OPD at the reference wavelength corresponding to each of the plurality of interferometer configurations comprises determining interferometer configurations where the AC component of the interferogram data at the reference wavelength is substantially zero, and determining the OPD to be a multiple of one half the reference wavelength.

10. A method as in claim 7, further comprising
    a. Determining the refractive index of the refractive scanner at a second selected sample wavelength;
    b. Determining the relationship between OPD at the reference wavelength and OPD at the second selected sample wavelength for a plurality of OPDs at the reference wavelengths;
    c. For each of a plurality of interferometer configurations, collecting interferogram data at the reference wavelength and at the second selected sample wavelength;
    d. Determining the OPD at the reference wavelength corresponding to each of the plurality of interfereometer configurations;
    e. Determining the OPD at the second selected sample wavelength corresponding to each of the plurality of interfereometer configurations from the OPD at the reference wavelength and the determined relationship;
    f. Associating the interferogram data at the second selected sample wavelength with the determined OPD at the second selected sample wavelength.

* * * * *